United States Patent
Wang et al.

(10) Patent No.: US 8,899,077 B2
(45) Date of Patent: Dec. 2, 2014

(54) SURFACE TREATMENT METHOD FOR GLASS SUBSTRATE AND ARTICLE MANUFACTURED BY THE SAME

(71) Applicants: Shenzhen Futaihong Precision Industry Co., Ltd., Shenzhen (CN); FIH (Hong Kong) Limited, Kowloon (HK)

(72) Inventors: Ren-Bo Wang, Shenzhen (CN); Chao-Sheng Huang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/671,684

(22) Filed: Nov. 8, 2012

(65) Prior Publication Data

US 2013/0323465 A1    Dec. 5, 2013

(30) Foreign Application Priority Data

May 31, 2012    (CN) ............ 2012 1 0176217

(51) Int. Cl.
- C03B 11/14        (2006.01)
- B32B 17/10        (2006.01)
- B32B 3/08         (2006.01)

(52) U.S. Cl.
CPC ............ *C03B 11/14* (2013.01); *C03B 2215/404* (2013.01); *B32B 17/10825* (2013.01); *B32B 3/08* (2013.01)

USPC ............................................................. 65/36

(58) Field of Classification Search
CPC    B29B 17/061; B29B 17/10825; B29C 70/68; B29C 70/683; C03B 11/14; C03B 23/0093; C03B 2215/404; C03B 2215/79; C03C 27/02; B32B 3/08; B32B 17/061; B32B 17/10825
USPC .................. 65/36, 49, 50, 59.1–59.7
See application file for complete search history.

(56) References Cited

U.S. PATENT DOCUMENTS

| | | | | |
|---|---|---|---|---|
| 314,828 | A | * | 3/1885 | Haines .......................... 65/146 |
| 2,026,606 | A | * | 1/1936 | Bausch .......................... 65/156 |
| 3,309,123 | A | * | 3/1967 | Edwards ........................ 264/80 |
| 3,417,274 | A | * | 12/1968 | Sprague et al. .............. 313/482 |
| 3,445,211 | A | * | 5/1969 | Kerstetter ........................ 65/56 |
| 4,260,405 | A | * | 4/1981 | Ambrogi .......................... 65/42 |
| 4,326,872 | A | * | 4/1982 | Miltenberger et al. ......... 65/112 |
| 4,351,856 | A | * | 9/1982 | Matsui et al. ................. 438/151 |
| 2008/0038083 | A1 | * | 2/2008 | Student et al. ................ 411/378 |

* cited by examiner

*Primary Examiner* — Matthew Daniels
*Assistant Examiner* — Cynthia Szewczyk
(74) *Attorney, Agent, or Firm* — Novak Druce Connolly Bove + Quigg LLP

(57) ABSTRACT

A surface treatment for a glass substrate includes at least following steps: the glass substrate is provided; a fastening device is provided, the fastening device defines a receiving groove corresponding to the glass substrate; the glass substrate is positioned in the receiving groove, and the fastening device is heated to achieve a softened glass substrate; a insert is provided; and the insert is hot pressed and inserted to the softened glass substrate. An article manufactured by the surface treatment method is also disclosed.

16 Claims, 3 Drawing Sheets

SURFACE TREATMENT METHOD FOR GLASS SUBSTRATE AND ARTICLE MANUFACTURED BY THE SAME

BACKGROUND

1. Technical Field

The exemplary disclosure generally relates to a surface treatment method for glass substrate and an article manufactured by the surface treatment method.

2. Description of Related Art

A glass substrate inserted with an insert can be formed by the following steps: a glass substrate is provided, a groove is defined in the glass substrate by milling; an insert is fixed in the groove by binder. However, after a period of use, the binder becomes worn and makes the insert peel from the glass substrate easily. Insert molding method requires high internal temperatures (higher than 800° C.) and high internal press of molding device to provide a fluid glass material which is used to form the glass substrate to overcome the above shortcomings. Additionally, the insert made of metal is easily damaged under the high internal temperature and high internal press.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary plastic composite and method for manufacturing the plastic composite. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
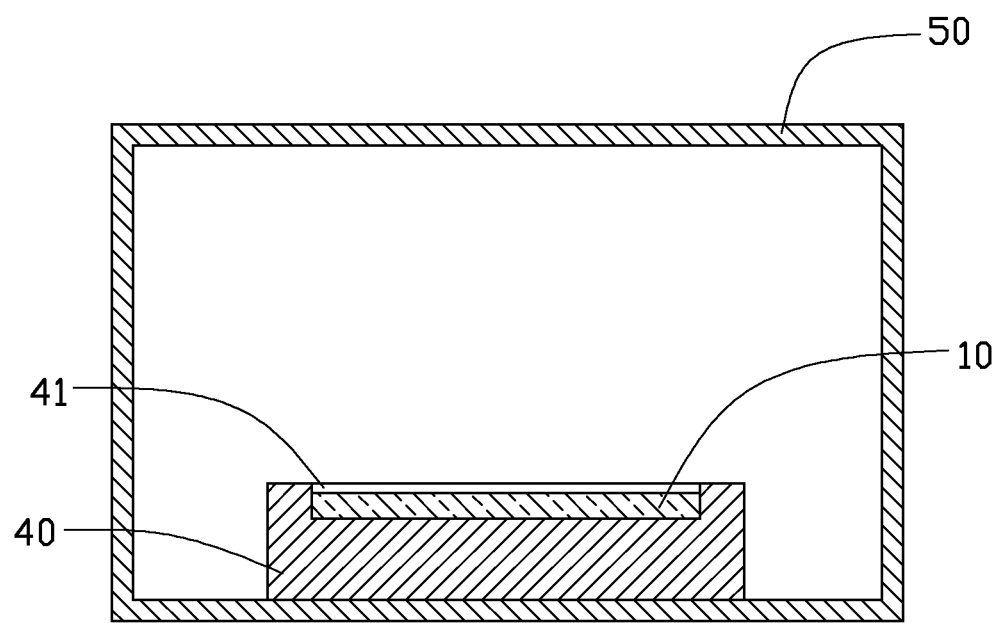
FIG. 1 is a schematic view of an embodiment of a glass substrate treated by softening treatment.
Figure 2:
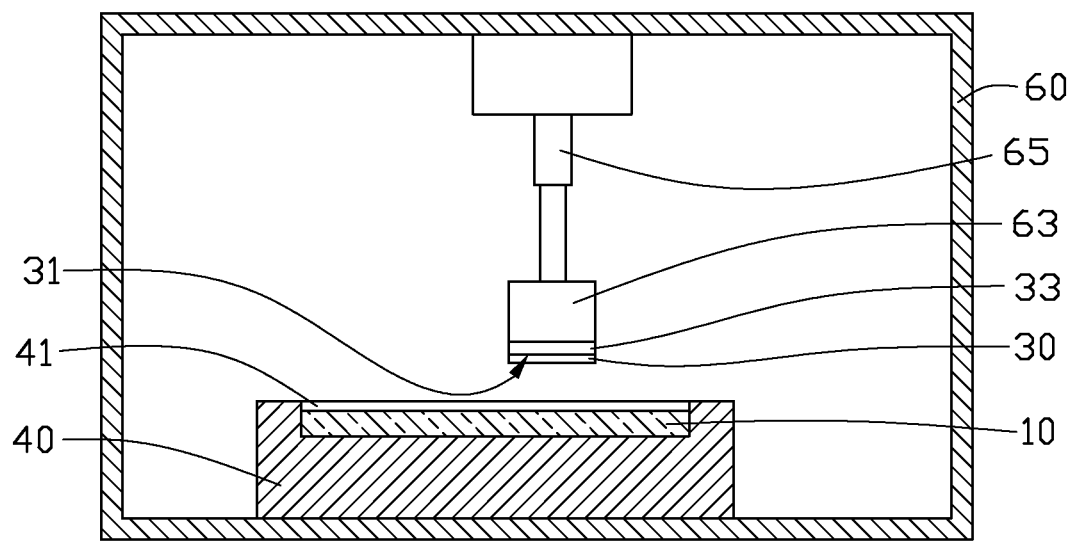
FIG. 2 is a schematic view of glass substrate of FIG. 1 treated by hot pressing.

Referring to FIGS. 1 and 2, an exemplary embodiment of a surface treatment for glass substrate may include at least following steps:

A glass substrate 10 is provided. The glass substrate 10 is degreased to remove contaminants of the substrate 10, such as grease or dirt. The glass substrate 10 is then dried. The glass substrate 10 has a thickness of about 0.5 mm to about 1.2 mm.

The glass substrate 10 is softened by the following steps:

A fastening device 40 is provided. The fastening device 40 defines a receiving groove 41 corresponding to the glass substrate 10. A releasing agent layer is formed on the inner surface of the receiving groove 41. Then, the glass substrate 10 is positioned in the receiving groove 41. The releasing agent layer can prevent softened glass substrate 10 from adhering to the fastening device 40.

The fastening device 40 is positioned in a furnace 50. The internal temperature of the furnace 50 is heated to the softening temperature of the glass substrate 10 and maintained at the softening temperature, for about 20 minutes (min) to about 30 min, to soften the glass substrate 10. In one embodiment, the internal temperature of the furnace 50 is heated to about 700° C. to about 800° C. at rate of 20° C./min to about 25° C./min.

An insert 30 is provided. The insert 30 may be made of stainless steel, titanium alloy, or ceramic. The insert 30 includes a first surface 31. The surface roughness (Ra) of the first surface 31 is about 0.05 μm to about 0.2 μm.

A protecting layer 33 is formed on the first surface 31 by spraying or printing. The protecting layer 33 mainly consists of boron nitride. The protecting layer 33 has a thickness of about 20 μm to about 35 μm. In one embodiment, paint used to form the protecting layer 33 contains boron nitride powder, and a small amount of organic material, wherein mass percentage of the boron nitride is about 90%-95%, mass percentage of the organic material is about 5%-10%. The organic material mainly contains acetone, ethyl acetate, dimethylbenzene, and mineral oil. The boron nitride powder has a particle size of about 0.8 μm to about 5 μm. The protecting layer 33 can prevent the first surface 31 of the insert 30 from oxidizing and being roughened by heat. Alternatively, the step of forming the protecting layer 33 can be omitted, when the insert 30 is made of ceramic.

The insert 30 is hot pressed at least by the following steps:

A hot pressing chamber 60 is provided. The chamber 60 is connected to a temperature control device (not shown), for controlling internal temperature of the chamber 60. The chamber 60 includes a fixing portion 63, to detachably fixing the insert 30, and a driving device 65, connected to the fixing portion 63. The driving device 65 is mounted on the top wall of the chamber 60 and drives the fixing portion 63, to move up and down vertically in reciprocating motion.

The insert 30 is fixed by the fixing portion 63. The fastening device 40 configured with the softened glass substrate 10 is positioned in the chamber 60 corresponding to the insert 30. The internal temperature of the chamber 60 is about 550° C. to about 650° C. The fixing portion 63 is driven by the driving device 65 moving towards the fastening device 40, and then the insert 30 is inserted into the softened glass substrate 10. After the hot press process, the glass substrate 10 is followed by a slow cooling to room temperature. In the embodiment, the glass substrate 10 is slowly cooled by the following steps: firstly, the internal temperature of the chamber 60 is decreased to about 250° C.-300° C. at a rate of about 5° C./min-10° C./min; secondly, the internal temperature of the chamber 60 is decreased from about 250-300° C. to about 60° C.-80° C. at a rate of about 1° C./min-3° C./min; and lastly, the chamber 60 is opened and cooled to room temperature naturally.

The protecting layer 33 is removed from the insert 30 by wrapping the insert 30 with a cloth immersed with water.

The first surface 31 is ground and polished. In one embodiment, "300-1000#" abrasive paper is used to remove burr of the glass substrate 10. After grinding, the surface roughness (Ra) of the first surface 31 is about 0.4 μm to about 1.0 μm. Then, the glass substrate 10 is polished by a polishing machine using a polishing solution containing ferric oxide and cerium oxide for about 40 min to about 80 min. After polishing, the surface roughness (Ra) of the glass substrate 10 and the first surface 31 are about 0.05 μm to about 0.2 μm.

Figure 3:
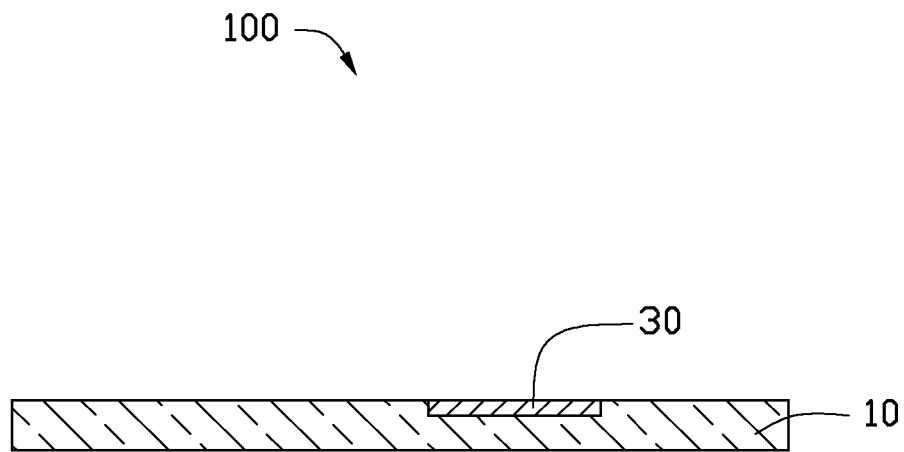
FIG. 3 is a cross-sectional view of an embodiment of an article.

Referring to FIG. 3, an article 100 manufactured by the surface treatment method is also provided. The article 100 includes a glass substrate 10, and an insert 30 inserted into the glass substrate 10 by hot pressing. The glass substrate 10 has a thickness of about 0.5 mm to about 1.2 mm. The insert 30 may be made of stainless steel, titanium alloy or ceramic. The surface roughness (Ra) of the glass substrate 10 and the insert 30 are about 0.05 μm to about 0.2 μm.

During the hot pressing process, the insert 30 is heated to about 550° C. to about 650° C. to prevent the formation of stress caused by temperature difference of the softened glass substrate 10 and the insert 30. During the cooling process, the difference of materials between the glass substrate 10 and the insert 30 makes a difference of cooling rate and provides a large temperature difference between the glass substrate 10 and the insert 30. However, the slow cooling process can prevent the glass substrate 10 or the insert 30 from being cracked or broken due to the large temperature difference, and can also avoid the formation of gap between the glass substrate 10 and the insert 30 to securely bond the insert 30 to the glass substrate 10.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A surface treatment method for a glass substrate comprising:
   providing the glass substrate;
   providing a fastening device, the fastening device defining a receiving groove corresponding to the glass substrate;
   positioning the glass substrate in the receiving groove, and heating the fastening device and the glass substrate to achieve a softened glass substrate;
   providing a insert; and
   hot pressing the insert by the following steps: providing a hot pressing chamber, the hot pressing chamber comprising a fixing portion to detachably fix the insert; the heated fastening device and glass substrate being positioned in the hot pressing chamber, the internal temperature of the hot pressing chamber being about 550° C. to about 650° C.; the insert being inserted into the softened glass substrate; and then the glass substrate is cooled by a cooling process.

2. The surface treatment method for a glass substrate of claim 1, wherein the fastening device is heated to the softening temperature of the glass substrate at rate of 20° C./min to about 25° C./min to soften the glass substrate.

3. The surface treatment method for a glass substrate of claim 2, wherein the fastening device is maintained at the softening temperature for about 20 min to about 30 min.

4. The surface treatment method for a glass substrate of claim 1, wherein the cooling process comprises the following steps: firstly, the internal temperature of the chamber is decreased to about 250° C.-300° C. at a rate of about 5-10° C./min; secondly, the internal temperature of the chamber is decreased from about 250° C.-300° C. to about 60° C.-80° C. at a rate of about 1° C./min-3° C./min; and lastly, the hot pressing chamber is opened and allowed to cool to room temperature.

5. The surface treatment method for a glass substrate of claim 1, wherein the surface treatment method further includes a step of forming a protecting layer on the insert before the hot pressing.

6. The surface treatment method for a glass substrate of claim 5, wherein the protecting layer comprises boron nitride.

7. The surface treatment method for glass substrate of claim 6, wherein the protecting layer has a thickness of about 20 μm to about 35 μm.

8. The surface treatment method for a glass substrate of claim 6, wherein the protecting layer formed by paint contains boron nitride powder and organic material.

9. The surface treatment method for a glass substrate of claim 8, wherein the organic material mainly contains acetone, ethyl acetate, dimethylbenzene, and mineral oil.

10. The surface treatment method for a glass substrate of claim 8, wherein mass percentage of the boron nitride is about 90%-95%.

11. The surface treatment method for a glass substrate of claim 8, wherein mass percentage of the organic material is about 5%-10%.

12. The surface treatment method for a glass substrate of claim 8, wherein the boron nitride powder has a particle size of about 0.8 μm to about 5 μm.

13. The surface treatment method for a glass substrate of claim 5, further comprising a step of removing the protecting layer from the insert after the hot pressing.

14. The surface treatment method for a glass substrate of claim 13, wherein the protecting layer is removed from the insert by wrapping the insert with a cloth immersed with water.

15. The surface treatment method for a glass substrate of claim 1, further comprising a step of grinding and polishing the glass substrate after the hot pressing.

16. The suffice treatment method for a glass substrate of claim 1, wherein the temperature of the heated fastening device and the glass substrate is higher than the internal temperature of the hot pressing chamber.

* * * * *